US012288511B2

(12) United States Patent
Ozbas et al.

(10) Patent No.: US 12,288,511 B2
(45) Date of Patent: Apr. 29, 2025

(54) DYNAMIC-VOLTAGE CONTROL FOR DISPLAYS

(71) Applicant: X Display Company Technology Limited, Dublin (IE)

(72) Inventors: Murat Ozbas, Penfield, NY (US); Ronald S. Cok, Rochester, NY (US)

(73) Assignee: X Display Company Technology Limited, Dublin (IE)

( * ) Notice: Subject to any disclaimer, the term of this patent is extended or adjusted under 35 U.S.C. 154(b) by 0 days.

(21) Appl. No.: 17/711,939

(22) Filed: Apr. 1, 2022

(65) Prior Publication Data

US 2023/0316996 A1 Oct. 5, 2023

(51) Int. Cl.
*G09G 3/3208* (2016.01)

(52) U.S. Cl.
CPC ... *G09G 3/3208* (2013.01); *G09G 2300/0857* (2013.01); *G09G 2330/021* (2013.01); *G09G 2340/0435* (2013.01)

(58) Field of Classification Search
None
See application file for complete search history.

(56) References Cited

U.S. PATENT DOCUMENTS

| | | | | |
|---|---|---|---|---|
| 5,550,066 | A | 8/1996 | Tang et al. | |
| 7,622,367 | B1 | 11/2009 | Nuzzo et al. | |
| 8,506,867 | B2 | 8/2013 | Menard | |
| 8,722,458 | B2 | 5/2014 | Rogers et al. | |
| 9,468,050 | B1 | 10/2016 | Rotzoll et al. | |
| 9,520,537 | B2 | 12/2016 | Bower et al. | |
| 9,799,261 | B2 | 10/2017 | Rotzoll | |
| 9,928,771 | B2 | 3/2018 | Cok | |
| 10,360,846 | B2 | 7/2019 | Cok et al. | |
| 10,388,205 | B2 | 8/2019 | Cok et al. | |
| 10,468,397 | B2 | 11/2019 | Cok | |
| 10,832,609 | B2 | 11/2020 | Rotzoll et al. | |
| 11,282,439 | B2 | 3/2022 | Cok et al. | |
| 11,302,259 | B2 * | 4/2022 | Park | G09G 3/3291 |
| 11,386,826 | B1 | 7/2022 | Cok et al. | |
| 11,393,404 | B2 * | 7/2022 | Seo | G09G 3/3233 |
| 2007/0091050 | A1 * | 4/2007 | Katayama | G09G 3/3688 345/98 |
| 2016/0093600 | A1 | 3/2016 | Bower et al. | |
| 2017/0018236 | A1 * | 1/2017 | Maeda | G09G 3/3446 |
| 2018/0373078 | A1 * | 12/2018 | Mizuno | G09G 3/36 |
| 2022/0122520 | A1 | 4/2022 | Cok et al. | |
| 2022/0165918 | A1 | 5/2022 | Bower et al. | |
| 2022/0343846 | A1 * | 10/2022 | Li | G09G 3/3233 |
| 2024/0312398 | A1 * | 9/2024 | Luo | G09G 3/2081 |

* cited by examiner

*Primary Examiner* — Benjamin C Lee
*Assistant Examiner* — Emily J Frank
(74) *Attorney, Agent, or Firm* — Choate, Hall & Stewart LLP; Michael D. Schmitt

(57) ABSTRACT

A dynamic-voltage-control pixel includes a pixel memory, an input circuit operable at a refresh voltage to receive pixel data and store the received pixel data in the pixel memory, a light emitter, and an output circuit operable at a drive voltage to read the stored pixel data from the pixel memory and control the light emitter to output light according to the read stored pixel data. The drive voltage can be less than the refresh voltage. The input circuit, pixel memory, and output circuit can be connected to a common-voltage wire providing a common voltage for operating each of the input circuit, pixel memory, and output circuit.

28 Claims, 8 Drawing Sheets

DYNAMIC-VOLTAGE CONTROL FOR DISPLAYS

FIELD OF THE DISCLOSURE

The present disclosure relates to flat-panel display architectures having reduced power use.

BACKGROUND OF THE DISCLOSURE

Flat-panel displays are widely used in conjunction with computing devices, in portable electronic devices, and for entertainment devices such as televisions. Such displays typically employ an array of pixels distributed over a display substrate to display images, graphics, or text. In a color display, each pixel includes light emitters that emit light of different colors, such as red, green, and blue. For example, liquid crystal displays (LCDs) employ liquid crystals to block or transmit light from a backlight behind the liquid crystals and organic light-emitting diode (OLED) displays rely on passing current through a layer of organic material that glows in response to the current. Displays using inorganic light-emitting diodes (LEDs) as pixel elements are also in widespread use for outdoor signage and have been demonstrated in a 55-inch television.

Displays are typically controlled with either a passive-matrix (PM) control scheme employing electronic control circuitry external to the pixel array or an active-matrix (AM) control scheme employing electronic control and storage circuitry in each pixel on the display substrate associated with each light-emitting element. Both OLED displays and LCDs using passive-matrix control and active-matrix control are available. An example of such an AM OLED display device is disclosed in U.S. Pat. No. 5,550,066.

Mobile electronic devices operate on battery power and frequently include a display. There is a need, therefore, to reduce the power used by a display to increase the amount of time the electronic device can operate before losing sufficient operating power and requiring a battery recharge.

SUMMARY

The present disclosure includes, among various embodiments, a flat-panel display with reduced power use. Such displays can be more efficient, can reduce operational costs, and can be particularly useful for mobile electronic devices that operate on battery power.

According to embodiments of the present disclosure, a dynamic-voltage-control pixel comprises a pixel memory, an input circuit operable at a refresh voltage to receive pixel data and store the received pixel data in the pixel memory, a light emitter, and an output circuit operable at a drive voltage to read the stored pixel data from the pixel memory and control the light emitter to output light according to the read stored pixel data. The drive voltage can be less than the refresh voltage.

In some embodiments, the pixel memory has a refresh leakage current at the refresh voltage and a drive leakage current at the drive voltage, and the refresh leakage current is greater than the drive leakage current. The pixel memory can be a static memory.

In some embodiments, a dynamic-voltage-control pixel comprises common-voltage wire connected to the input circuit, the pixel memory, and the output circuit.

In some embodiments, any one or more of the input circuit, the pixel memory, and the output circuit are electrically connected to a refresh-voltage wire and a drive-voltage wire separate from the refresh-voltage wire and wherein the any one or more of the input circuit, the pixel memory, and the output circuit comprises a voltage-selection circuit for selecting the drive-voltage wire or the refresh-voltage wire. In some embodiments, the input circuit can be electrically connected to only the refresh-voltage wire or the output circuit can be electrically connected to only the drive-voltage wire, or both. The pixel memory can be electrically connected to both the refresh-voltage wire and the drive-voltage wire and can comprise a voltage-selection circuit for selecting the drive-voltage wire or the refresh-voltage wire (e.g., selects the voltage provided on the drive-voltage wire or the refresh-voltage wire).

According to some embodiments of the present disclosure, a dynamic-voltage-control display comprises a pixel array of dynamic-voltage-control pixels and a display controller operable to control the dynamic-voltage-control pixels. The display controller can be operable to provide the drive voltage to the dynamic-voltage-control pixels in a drive mode and provide the refresh voltage in a refresh mode. The dynamic-voltage-control pixels can be operable to (i) receive respective pixel data and store the respective pixel data in the pixel memory in the refresh mode and (ii) read the respective stored pixel data from the pixel memory and then control the light emitter to output light according to the respective pixel data in the drive mode.

In some embodiments, the dynamic-voltage-control pixels can be connected in common to a common-voltage wire controlled by the display controller to provide the refresh voltage in a refresh mode on the common-voltage wire and to provide the drive voltage in a drive mode to the dynamic-voltage-control pixels on the common-voltage wire.

In some embodiments, the dynamic-voltage-control pixels in the array are arranged in rows and columns and the dynamic-voltage-control pixels in each of the rows are connected in common to a common row voltage wire for the row that is controlled by the display controller. The display controller can be operable to provide the refresh voltage to a refresh row of the rows and the drive voltage to drive rows of the rows that are each different from the refresh row. The display controller can be operable to provide pixel data to each of the dynamic-voltage-control pixels at a refresh rate and the refresh voltage can be directly dependent on the refresh rate. The display controller can be operable to provide pixel data to each of the dynamic-voltage-control pixels at a refresh rate and the output circuit of the dynamic-voltage-control pixel can be operable to control the light emitter of the dynamic-voltage-control pixel to emit light at an output rate greater than the refresh rate. The display controller can be operable to provide pixel data to the dynamic-voltage-control pixels at a data rate that can be directly dependent on the refresh rate.

In some embodiments, at least some of the dynamic-voltage-control pixels are connected to a refresh voltage wire controlled by the display controller and to a drive voltage wire controlled by the display controller, and the display controller is operable to (i) provide the refresh voltage to the refresh voltage wire and pixel data to the at least some of the dynamic-voltage-control pixels that are in a row of pixels at the refresh voltage in a refresh mode and (ii) provide a zero voltage to the refresh voltage wire to the row of pixels in a drive mode.

According to embodiments of the present disclosure, a method of controlling a dynamic-voltage-control display comprises providing the refresh voltage to the at least some of the dynamic-voltage-control pixels on the refresh voltage wire, refreshing the pixel memory of the at least some of the dynamic-voltage-control pixels with the pixel data, providing the drive voltage to the at least some of the dynamic-voltage-control pixels on the drive voltage wire, and providing a zero voltage to the at least some of the dynamic-voltage-control pixels on the refresh voltage wire.

According to embodiments of the present disclosure, a method of controlling a dynamic-voltage-control pixel comprises providing the refresh voltage to the dynamic-voltage-control pixel, refreshing the pixel memory with the pixel data, providing the drive voltage to the dynamic-voltage-control pixel, and reading the pixel data from the pixel memory and controlling the light emitter to output light corresponding to the pixel data. Some embodiments comprise providing the refresh voltage to a refresh row of the dynamic-voltage-control pixels and providing pixel data to the refresh row of the pixels and providing the drive voltage to drive rows of the dynamic-voltage-control pixels other than the refresh row of dynamic-voltage-control pixels and driving the light emitters of the dynamic-voltage-control pixels in the drive rows to emit light. Some embodiments comprise successively selecting different refresh rows of the pixels. Some embodiments comprise providing pixel data to the refresh row of dynamic-voltage-control pixels at a refresh rate and driving the dynamic-voltage-control pixels in the drive rows of dynamic-voltage-control pixels at a drive rate, and the drive rate is greater than the refresh rate.

According to embodiments of the present disclosure, a dynamic-voltage-control circuit comprises a circuit memory, an input circuit operable at a refresh voltage to receive circuit data and store the circuit data in the circuit memory, a functional circuit, and a functional drive circuit operable at a drive voltage to read the circuit data from the circuit memory and then control the functional circuit to operate according to the circuit data. The drive voltage can be less than the refresh voltage.

According to some embodiments of the present disclosure, the pixels in the array of pixels comprise inorganic light-emitting diodes, for example micro-light-emitting diodes and each of the one or more inorganic micro-light-emitting-diodes has a length and a width each no greater than 200 microns.

Embodiments of the present disclosure provide active-matrix display and pixel control methods and architectures that reduce display power use.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which.

Figure 1:
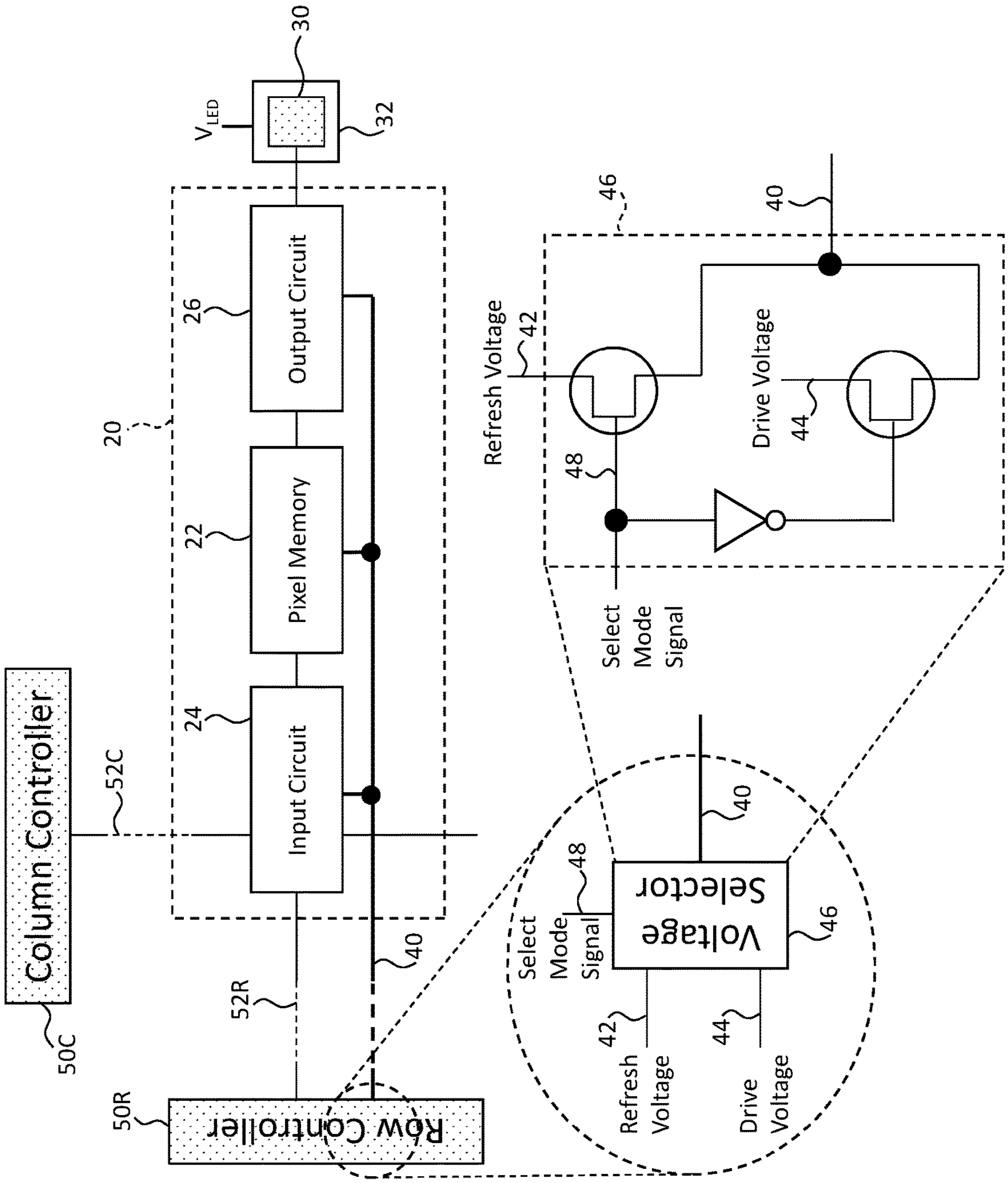
FIG. 1 is a schematic diagram of a dynamic-voltage-control pixel circuit for an active-matrix display according to illustrative embodiments of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The figures are not drawn to scale since the variation in size of various elements in the Figures is too great to permit depiction to scale.

DETAILED DESCRIPTION OF CERTAIN EMBODIMENTS

The row and column signal driving circuits in a matrix-addressed flat-panel pixel array disposed on a substrate must electrically drive row and column signals at the desired frequency and distance over the substrate and maintain row and column signal integrity to every row and column of pixels in the array. For large arrays driven at a fast frame rate on a large substrate, the row and column signals can degrade because of row and column wire resistance, parasitic capacitance and inductance, and transmission line impedance discontinuities. Embodiments of the present disclosure provide, inter alia, dynamic-voltage-control pixel array methods and architectures that enable improved control and signal distribution for flat-panel active-matrix arrays (e.g., flat-panel arrays with a relatively large substrate and many pixels). The dynamic-voltage-control pixels can comprise inorganic light-emitting diodes and the dynamic-voltage-control pixel arrays can comprise analog or digital pixels in displays. In some embodiments, the dynamic-voltage-control pixels can comprise inorganic micro-LEDs and the dynamic-voltage-control pixel array can be a micro-LED display.

According to embodiments of the present disclosure and as illustrated in FIG. 1, a dynamic-voltage-control pixel 20 comprises a pixel memory 22, an input circuit 24 operable at a refresh voltage 42 to receive pixel data and store the received pixel data in pixel memory 22, a light emitter 30, and an output circuit 26 operable at a drive voltage 44 to read the stored pixel data from pixel memory 22 and control light emitter 30 to output light according to the read stored pixel data, for example with a light-emitter drive circuit 32. The drive voltage 44 is less than the refresh voltage 42.

Pixel memory 22 can have a refresh leakage current at the refresh voltage 42 and a drive leakage current at the drive voltage 44. The refresh leakage current can be greater than the drive leakage current. According to embodiments of the present disclosure, pixel memory 22 can be a static memory (e.g., a random access memory or a register).

In some embodiments, input circuit 24, pixel memory 22, and output circuit 26 are all connected to and operate on a common-voltage wire 40. In embodiments of the present disclosure, an electrically conductive wire provides an electrical connection, for example between two electronic circuit elements, devices, or components. Row controller 50R and column controller 50C can also operate at or provide signals at a desired voltage (e.g., refresh voltage 42 or drive voltage 44) on corresponding row wires 52R and column wires 52C. (For clarity in the figures, element 40 refers to both the common voltage 40 and to the common-voltage wire 40 or connection providing common voltage 40. Element 42 refers to both the refresh voltage 42 and to the refresh-voltage wire 42 or connection providing refresh voltage 42. Element 44 refers to both the drive voltage 44 and to the drive-voltage wire 44 or connection providing drive voltage 44.) According to embodiments of the present disclosure, operating pixel memory 22 (and dynamic-voltage-control pixel 20) at drive voltage 44 reduces power use because less current is lost through leakage, e.g., through transistor gate dielectrics. In particular, leakage through a transistor-based memory can be a significant power drain particularly for large memory arrays (e.g., as found in large, high-resolution displays) constructed with small, high-resolution transistors comprising thin dielectric materials through which current can more readily leak. This leakage effect can be substantial for small transistors, particularly for those with resolutions (nodes) less than 50 nm, less than 20 nm, less than 10 nm, or less than 5 nm. Moreover, the power loss can increase at a rate greater than a linear rate related to the resolution. Thus, operating the memory at a reduced voltage when reading the memory contents out to display the contents through one or more light emitters 30 can reduce power loss. However, communicating pixel data over a large substrate at a relatively low voltage reduces the signal-to-noise ratio of the communicated pixel data. Display circuits can be electrically noisy, have a limited conductivity, width, or depth due to limited area on a display substrate, operate at a relatively high frequency, or a combination of these, making signal-to-noise ratios on row wires 52R and column wires 52C an important concern. Hence, a higher voltage is preferred to transmit data into a pixel (e.g., row-select signals on row wires 52R and column-data signals on column wires 52C) but a lower voltage is preferred to operate dynamic-voltage-control pixel 20, pixel memory 22, or output circuit 26. In some embodiments, an output (display) rate for pixel data in pixel memory 22 is greater than an input (refresh) rate for pixel data, so that the amount of time spent updating pixel data at refresh voltage 42 is smaller than the amount of time spent displaying data at drive voltage 44. Thus, according to embodiments of the present disclosure, a pixel can reduce power loss and improve function by operating at a relatively higher refresh voltage 42 with an improved signal-to-noise ratio to receive pixel data and by operating at a relatively lower drive voltage 44 with reduced current leakage to display pixel data. The amount of time dynamic-voltage-control pixel 20 spends operating at refresh voltage 42 can be less than the time spent operating at drive voltage 44.

Figure 2:
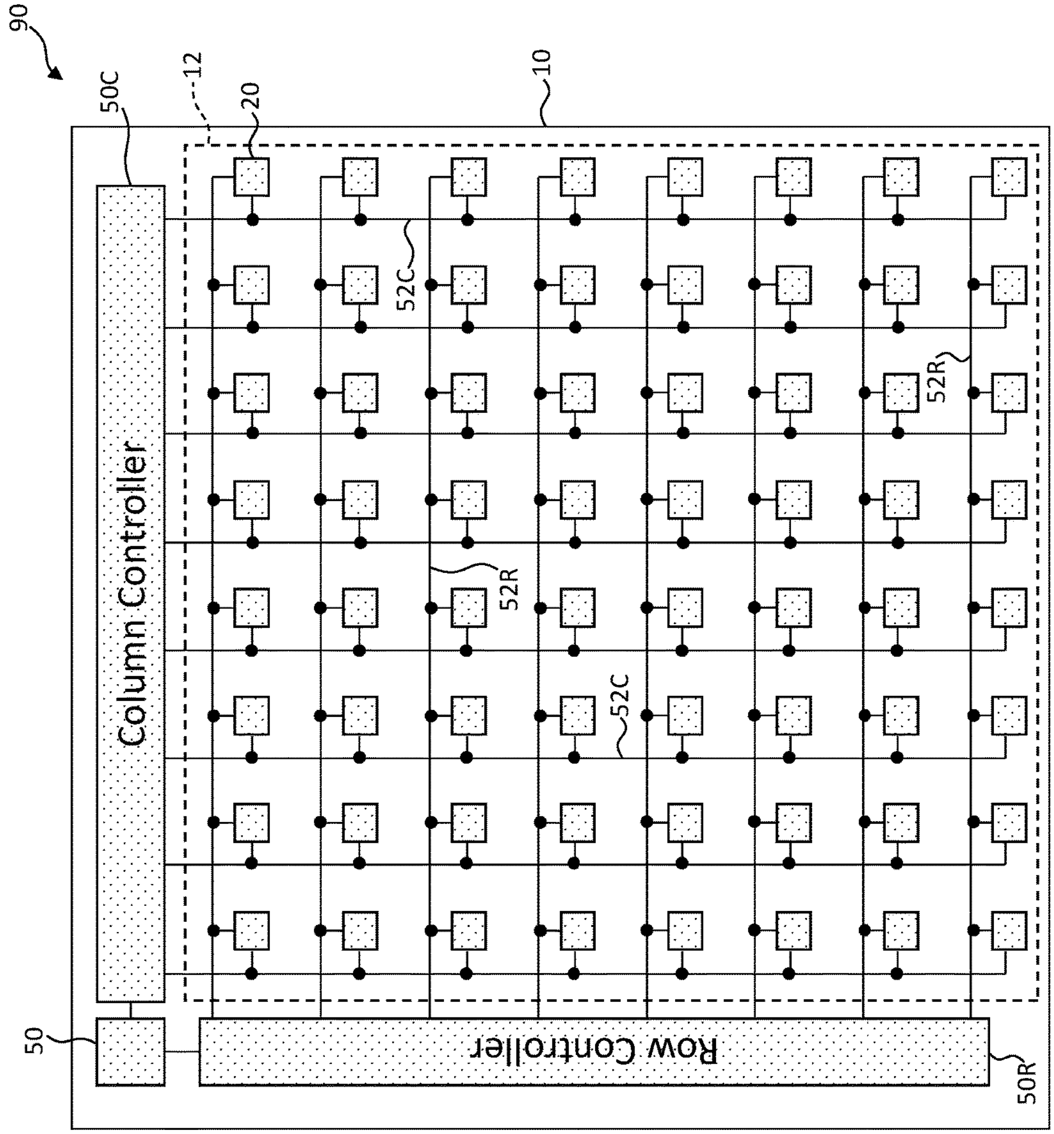
FIG. 2 is a schematic diagram of a dynamic-voltage-control display according to illustrative embodiments of the present disclosure.

FIG. 2 illustrates embodiments of a dynamic-voltage-control display 90 in which a pixel array 12 of dynamic-voltage-control pixels 20 are distributed over a display substrate. Dynamic-voltage-control pixels 20 can be disposed in a regular array over display substrate 10. Rows of dynamic-voltage-control pixels 20 controlled by row controller 50R can be connected with row wires 52R and columns of dynamic-voltage-control pixels 20 controlled by column controller 50C can be connected with column wires 52C. Display controller 50 can control row controller 50R and column controller 50C, or row controller 50R and column controller 50C can comprise at least a part of display controller 50.

In operation, display controller 50 provides information and control signals to row controller 50R (e.g., timing signals, row-select signals, or common voltages 40 on a common-voltage wire 40) and pixel data and control signals to column controller 50C (e.g., column-data signals). Dynamic-voltage-control pixels 20 receive the row and column signals from row wires 52R and column wires 52C and display received information with one or more light emitters 30 (e.g., light-emitting diodes or LEDs such as inorganic LEDs). Display controller 50 (e.g., comprising row controller 50R or column controller 50C, or both) controls dynamic-voltage-control pixels 20 in a display, for example using a voltage selector 46 or multiplexer disposed in the row or column controller 50R, 50C responsive to a refresh or drive mode-select signal 48 as shown in the FIG. 1 inset, to select and operate dynamic-voltage-control pixels 20 at the relatively greater refresh voltage 42 and transmits pixel data to the dynamic-voltage-control pixels 20. The pixel data can also be transmitted at voltages equal to refresh voltage 42. After the pixel data is transmitted by row controller 50R and column controller 50C, display controller 50 selects the relatively smaller drive voltage 44 with voltage selector 46 so that dynamic-voltage-control pixels 20 operate at and drive light emitters 30 to emit light corresponding to the pixel data with reduced current leakage and reduced power. Dynamic-voltage-control pixels 20 can drive a light-emitter drive circuit 32 (e.g., an analog or mixed-signal circuit) that directly controls light emitter 30 to emit light. Using digital circuitry for dynamic-voltage-control pixels 20 can reduce circuit size and power and reduce the amount of relatively larger analog circuitry required in light-emitter drive circuit 32. Keeping an LED drive connection (VLED) separate from refresh or drive voltage 42, 44 can also save power.

Thus, according to embodiments of the present disclosure, a dynamic-voltage-control display 90 comprises dynamic-voltage-control pixels 20 and display controller 50 operable to control the dynamic-voltage-control pixels 20. Display controller 50 is operable to provide drive voltage 44 to dynamic-voltage-control pixels 20 in a drive mode and provide refresh voltage 42 in a refresh mode and is operable to provide control and data signals (e.g., row-select signals on row wires 52R and column-data signals on column wires 52C) at refresh voltage 42. Dynamic-voltage-control pixels 20 are operable to (i) receive pixel data and store the received pixel data in pixel memory 22 in the refresh mode and (ii) read the stored pixel data from pixel memory 22 and control light emitter 30 to output light according to the read stored pixel data in the drive mode. In some embodiments, the refresh mode (and use of refresh voltage 42) is less frequent than the drive mode (and use of drive voltage 44) for pixel data output. In some embodiments, the refresh mode is on-demand and updated pixel data is supplied to dynamic-voltage-control pixel 20 only when new pixel data is available.

Figure 3:
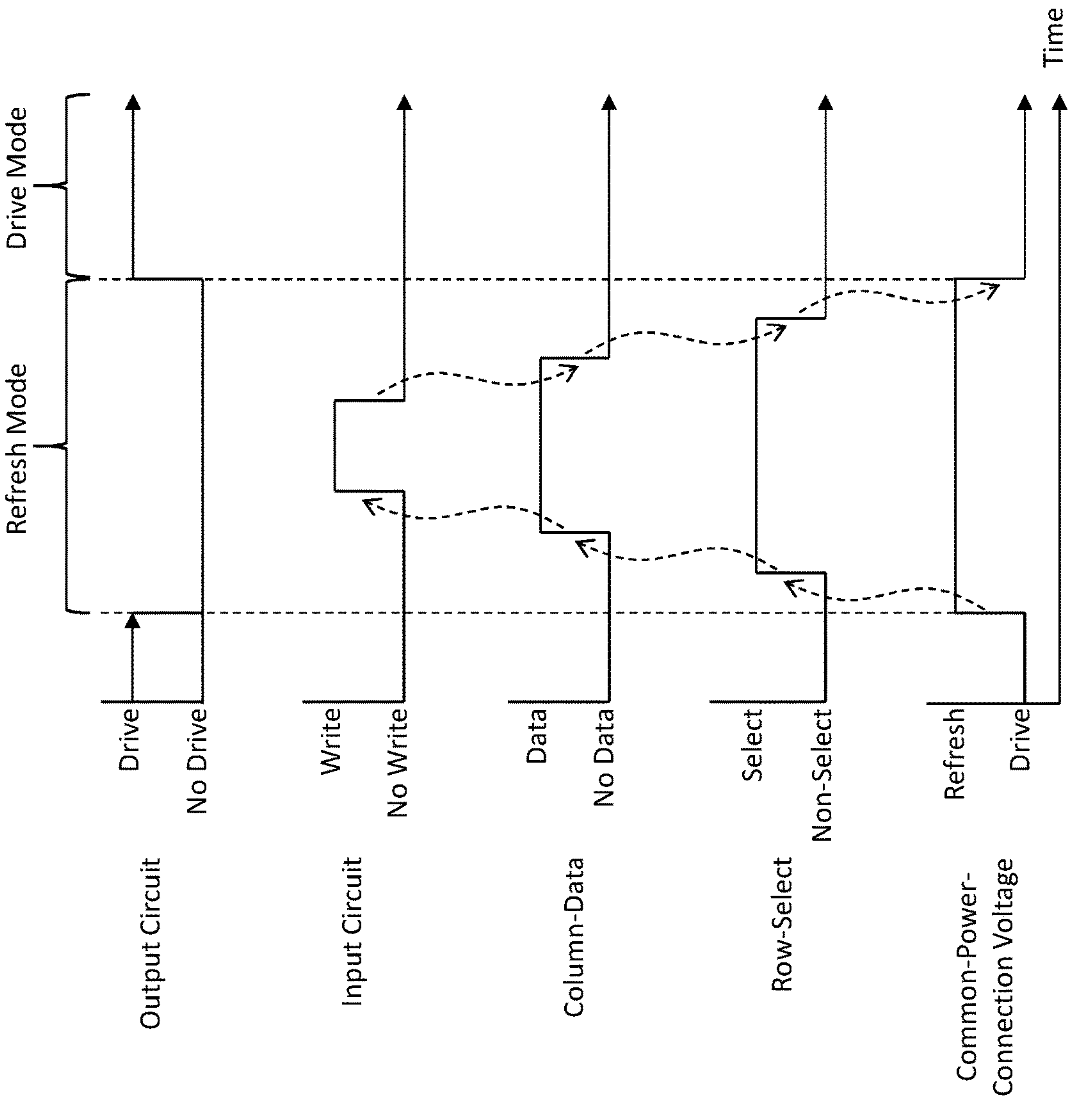
FIG. 3 is a timing diagram useful in understanding illustrative embodiments of the present disclosure.

As shown in the timing diagram of FIG. 3, operation of dynamic-voltage-control display 90 can be operated with a common power connection with a common voltage 40 provided on common-voltage wire 40. At the beginning of a refresh mode (e.g., an image write or update process in response to new image pixel data), refresh voltage 42 is provided on common-voltage wire 40 (e.g., common voltage 40 is set to refresh voltage 42). The refresh process can then begin with relatively higher operating and transmission voltages providing control and data signals with better signal-to-noise ratio. A row-select signal can be set (e.g., at refresh voltage 42 on row wire 52R) and then column-data signals transmitted (e.g., at refresh voltage 42 on column wire 52C). The transmitted column-data signals (pixel data) can be written by input circuit 24 into pixel memory 22. Generally, input circuit 24 should be operated at a voltage that is at least as great as the voltage of an input signal. When the data is written, the column-data signals can be quiescent, the row-select signal turned off, and common voltage 40 set to drive voltage 44 less than refresh voltage 42 (e.g., by using voltage selector 46) in drive mode, thus saving power in dynamic-control-voltage pixel 20. Output circuit 26 then reads refreshed pixel data from pixel memory 22 and drives light-emitter drive circuit 32 with the refreshed pixel data, causing light emitter 30 to emit light responsive to the refreshed pixel data. When new pixel data is available, the process can begin again by switching into refresh mode at refresh voltage 42.

Figure 4A:
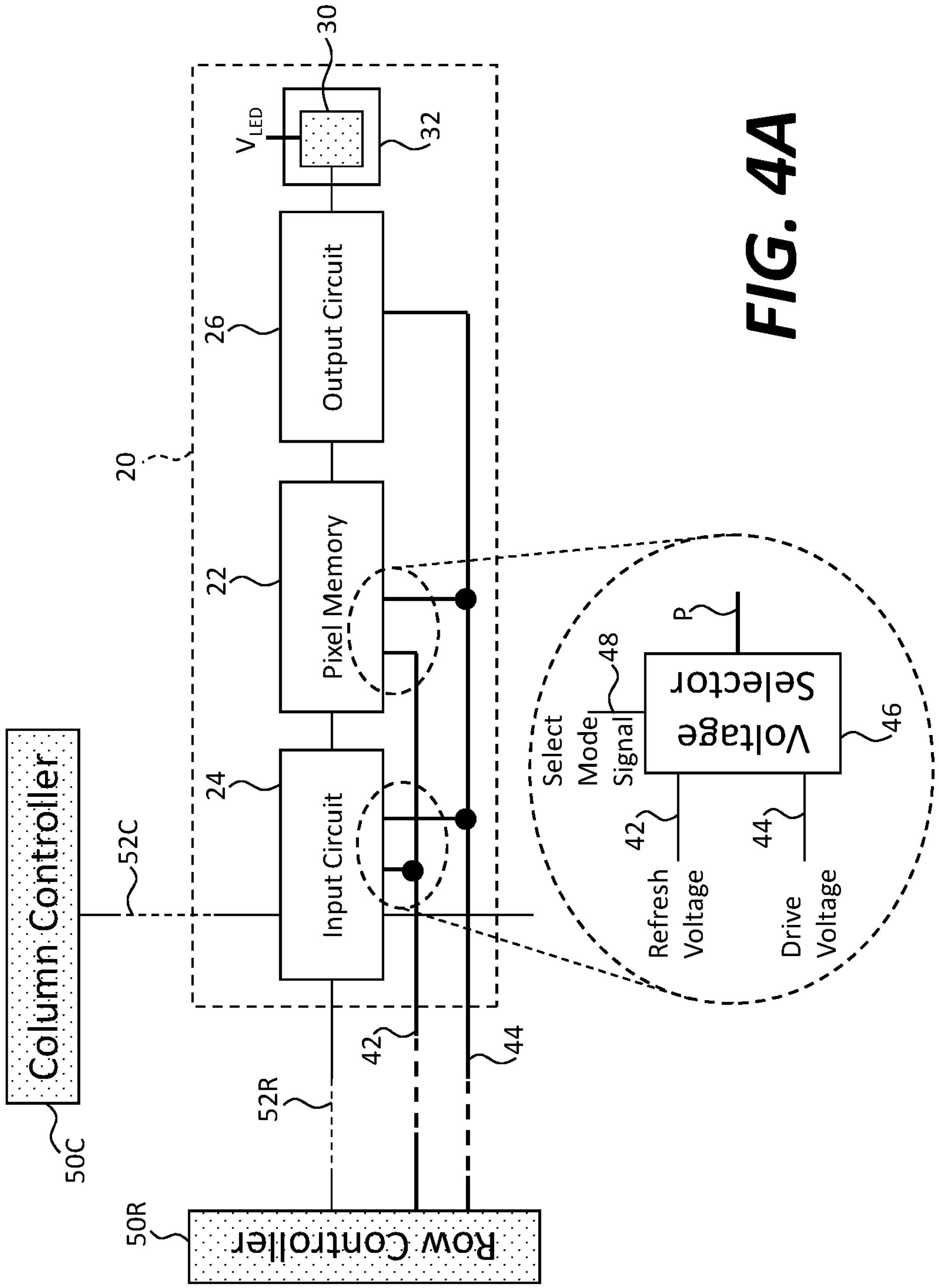
FIG. 4A is a schematic diagram of a dynamic-voltage-control pixel circuit for an active-matrix display according to illustrative embodiments of the present disclosure.

FIG. 1 illustrates a dynamic-voltage-control pixel 20 electrically connected with a common-voltage wire 40. In some embodiments, and as illustrated in FIG. 4A, input circuit 24 and pixel memory 22 (and optionally output circuit 26) are connected to two different power signals, a refresh-voltage wire 42 and drive-voltage wire 44. Each of input circuit 24 and pixel memory 22 (and optionally output circuit 26) can comprise a voltage selector 46 (a voltage multiplexer) responsive to a mode-select signal 48 (e.g., a signal specifying refresh mode or drive mode). Each of input circuit 24 and pixel memory 22 (and optionally output circuit 26) can comprise a voltage selector 46 (a voltage multiplexer) responsive to a mode-select signal 48 (e.g., a signal specifying refresh mode or drive mode).

In operation, mode-select signal 48 is set to refresh mode (e.g., by row controller 50R or column controller 50C), signals are transmitted to input circuit 24 at refresh voltage 42 and at least input circuit 24 operates at refresh voltage 42 to receive the transmitted signals (e.g., row-select, timing, control, or column-data signals). Pixel memory 22 can optionally select and operate at refresh voltage 42 in response to input circuit 24. Output circuit 26 can, but does not necessarily select and operate at refresh voltage 42. In some embodiments, output circuit 26 operates only at drive voltage 44. Once pixel data has been received by pixel memory 22, all of pixel memory 22, input circuit 24, and output circuit 26 can select and operate at drive voltage 44 (e.g., in response to mode-select signal 48 (e.g., provided by display controller 50) to output pixel data to light-emitter drive circuit 32 and light emitter 30. Thus, in some embodiments of the present disclosure, an input circuit 24 comprises a refresh-voltage wire 42 and a drive-voltage wire 44 separate refresh-voltage wire 42 and input circuit 24 comprises a voltage-selection circuit for selecting the drive-voltage wire 44 or the refresh-voltage wire 42.

In some embodiments, refresh voltage 42 can be set to zero volts in drive mode and input circuit 24 can be turned off, further saving power in dynamic-voltage-control pixel 20. In some such embodiments, voltage selector 46 of input circuit 24 selects between drive voltage 44 and zero volts responsive to mode-select signal 48. Thus, in some embodiments, dynamic-voltage-control pixels 20 are connected to a refresh-voltage wire 42 controlled by display controller 50 and a drive-voltage wire 44 controlled by display controller 50. Display controller 50 can be operable to (i) provide refresh voltage 42 to refresh-voltage wire 42 and pixel data to the dynamic-voltage control pixels 20 in a row of dynamic-voltage control pixels 20 at the refresh voltage 42 in a refresh mode and (ii) provide a zero voltage to refresh-voltage wire 42 to the row of dynamic-voltage control pixels 20 in a drive mode.

Figure 4B:
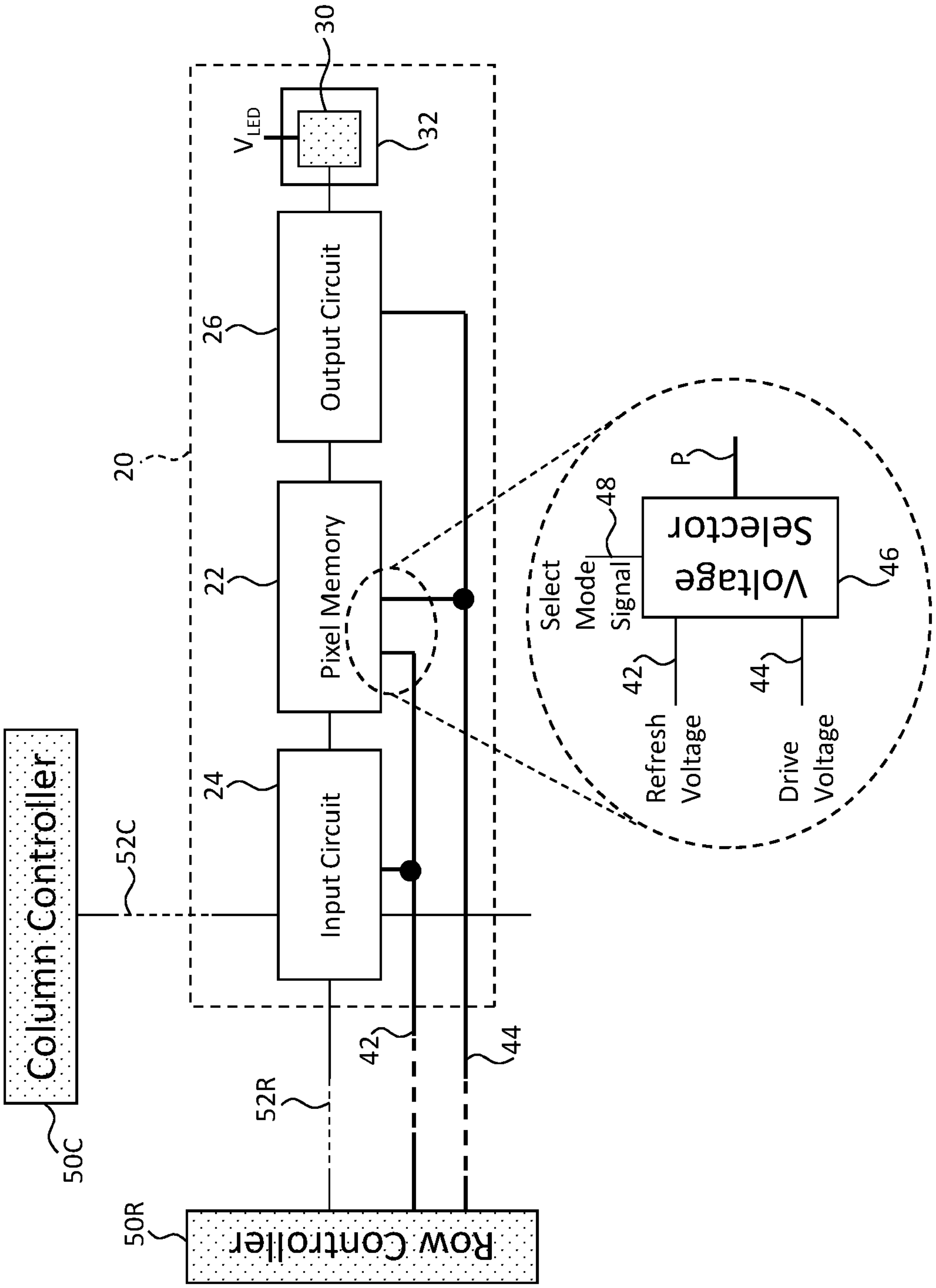
FIG. 4B is a schematic diagram of a dynamic-voltage-control pixel circuit for an active-matrix display according to illustrative embodiments of the present disclosure.

As illustrated in FIG. 4B, input circuit 24 is electrically connected to refresh-voltage wire 42, pixel memory 22 is electrically connected to refresh-voltage wire 42 and drive-voltage wire 44 (and comprises voltage selector 46 responsive to mode-select signal 48), and output circuit 26 is connected to drive-voltage wire 44. Such embodiments have less circuitry and input and output circuits 24, 26 are directly connected to power supplies of the appropriate voltage. If refresh voltage is set to zero volts in drive mode, input circuit 24 is turned off.

Flow diagram 5 illustrates an overall process for dynamic-voltage-control display 90. Dynamic-voltage-control display 90 and pixel data are provided in step 100. In step 110, dynamic-voltage-control pixels 20 are provided with power at refresh voltage 42 on the refresh-voltage wire 42 and pixel data is loaded into pixel memory 22 in step 120. Once the pixel data is loaded, dynamic-voltage-control pixels 20 are provided with power at drive voltage 44 on the drive-voltage wire 44 in step 130 and pixel data is provided to light emitter 30 in step 140. The process can then be repeated when new pixel data is available.

Figure 6:
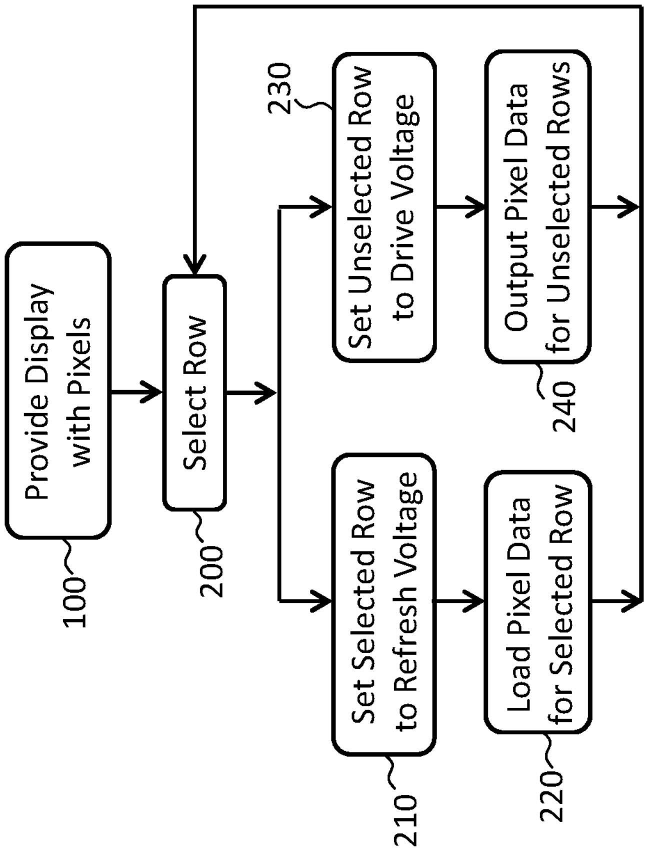
FIGS. 5-8 are flow diagrams according to illustrative embodiments of the present disclosure.

Dynamic-voltage-control display 90 can comprise dynamic-voltage-control pixels 20 disposed in rows and columns over display substrate 10, as shown in FIG. 3, and the refresh and drive voltage control can be provided on a row-by-row basis to further save power in dynamic-voltage-control display 90 by controlling one row to operate at refresh voltage 42 and receive pixel data while the other rows in dynamic-voltage-control display 90 are controlled at drive voltage 44 to display pixel data with light emitter 30. FIG. 6 illustrates methods according to embodiments of the present disclosure. As shown in FIG. 6, dynamic-voltage-control display 90 and pixel data are provided in step 100, as in FIG. 5. A row of dynamic-voltage-control pixels 20 is selected in step 200, the selected row is set to operate at refresh voltage 42 in step 210 and the unselected rows (all of the rows in dynamic-voltage-control display 90 other than the selected row) are set to operate at drive voltage 44 in step 230. Pixel data is loaded into the selected row at the refresh voltage in step 220 at the same time as the pixel data in the unselected rows is output in step 240. A new row is then selected to receive pixel data in step 220. In some embodiments, new and different rows are selectively selected, for example adjacent rows in row order from a first row to a last row (e.g., a top row to a bottom row) of pixel array 12.

Figure 5:
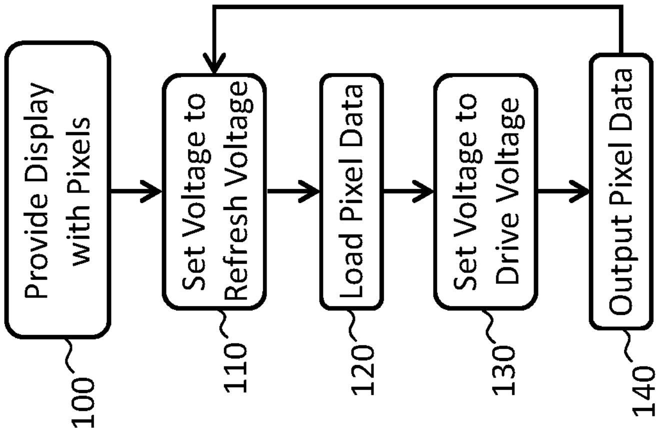
Figure 7:
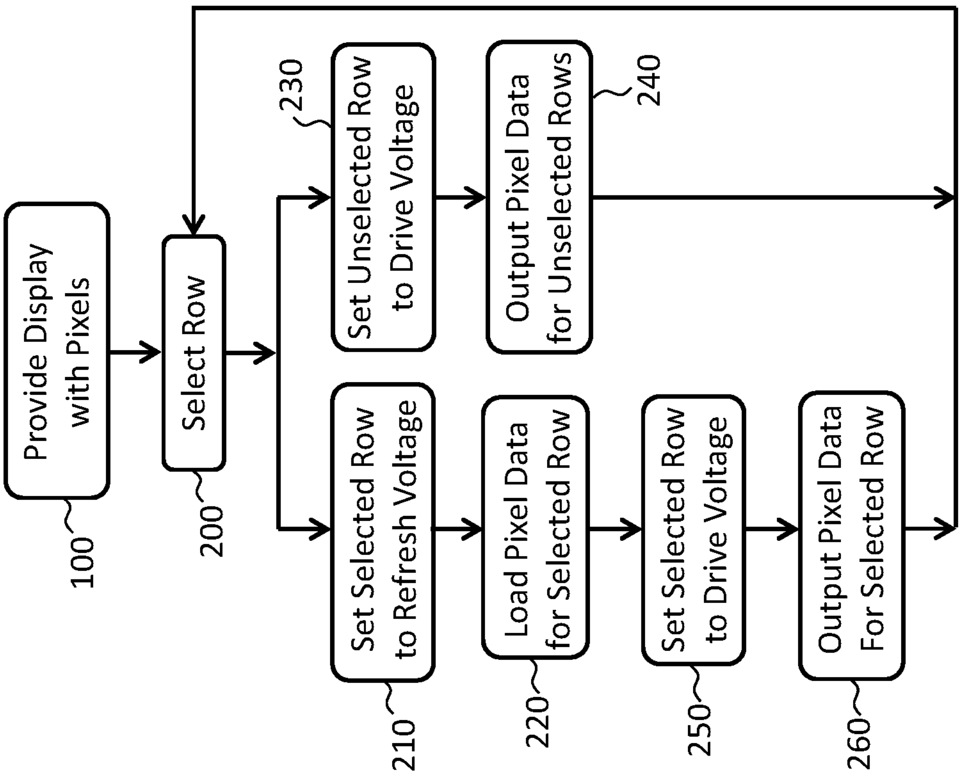

As shown in FIG. 7 and where new pixel data is not necessarily immediately available, dynamic-voltage-control display 90 and pixel data are provided in step 100, as in FIG. 5. A row of dynamic-voltage-control pixels 20 is selected in step 200, the selected row is set to operate at refresh voltage 42 in step 210 and the unselected rows (all of the rows in dynamic-voltage-control display 90 other than the selected row) are set to operate at drive voltage 44 in step 230. Pixel data is loaded into the selected row at the refresh voltage in step 220 at the same time as the pixel data in the unselected rows is output in step 240. Once the pixel data is loaded into the selected row, the selected row can be operated at drive voltage 44 in step 250 and pixel data is output from the selected row at drive voltage 44 in step 260 until new pixel data is available and a new row is selected in step 200. Such methods can reduce display flicker by outputting pixel data in the selected row before a new row is selected. A drive (output) rate at which pixel data is output from output circuit 26 can be greater than a refresh (input) rate at which pixel data is input to input circuit 24, for example to reduce flicker in dynamic-voltage-control display 90.

Figure 8:
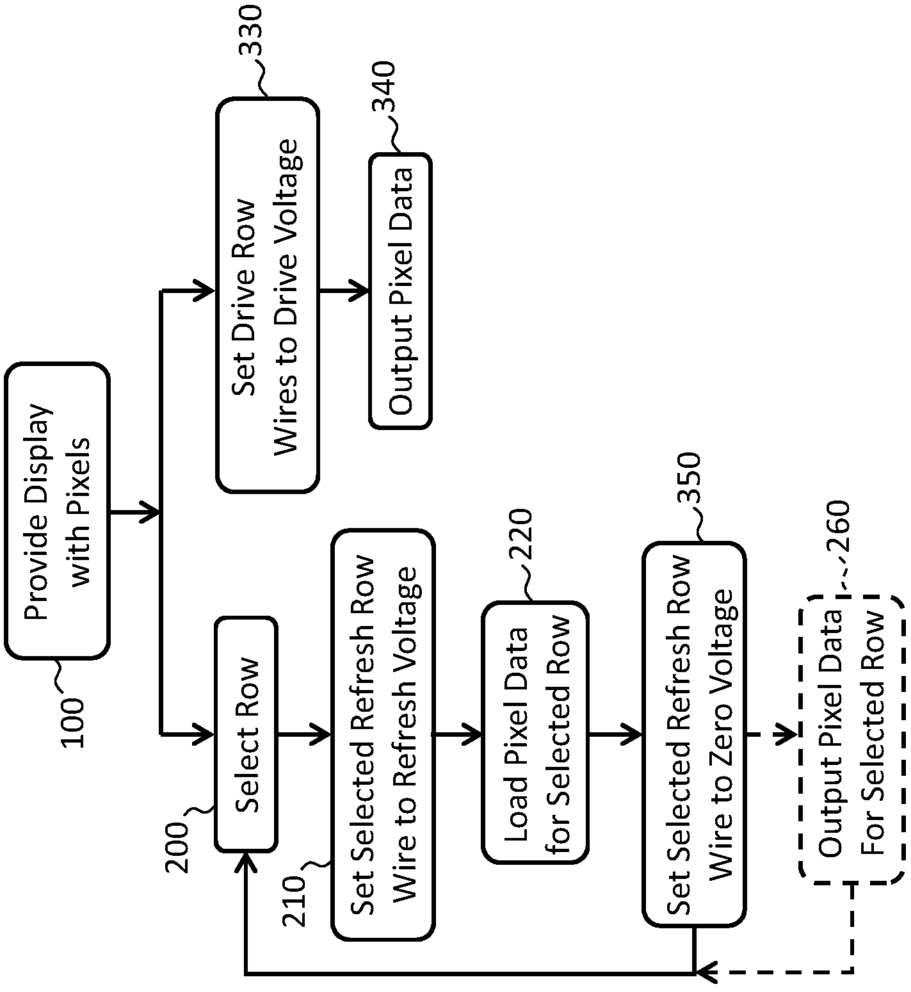

As shown in FIG. 8 and corresponding to some embodiments of FIG. 4, once the pixel data is loaded into the selected row in step 220, a zero voltage can be supplied on refresh-voltage wire 42 in step 350, while the drive-voltage wires 44 for the unselected rows are set to drive voltage 44 in step 330 to output data in step 340. When pixel data for a new row is available, a new row can be selected in step 200 (e.g., corresponding to FIG. 6) or pixel data in the selected row can be immediately output (e.g., corresponding to FIG. 7). Using a zero voltage for input circuits 24 can reduce power use in dynamic-voltage-control display 90.

Thus, according to embodiments of the present disclosure, display controller 50 is operable to provide refresh voltage 42 to a refresh row and drive voltage 44 to drive rows. In some embodiments, drive rows are rows of pixel array 12 that are not a refresh row.

Signal-to-noise ratio can be dependent on both signal voltage and signal frequency. Thus, a selected refresh voltage 42 can depend on the frequency of a refresh signal (e.g., row-select or column-data signals). In some embodiments, display controller 50 is operable to provide pixel data to each dynamic-voltage-control pixel 20 at a refresh rate (frequency) and refresh voltage 42 is directly dependent on the refresh rate (frequency). If the refresh rate decreases, refresh voltage 42 can also decrease. The refresh rate can be a data rate, e.g., a rate at which pixel data is provide to dynamic-voltage-control pixel 20. The data rate then is likewise directly dependent on the refresh rate. In some embodiments, output circuit 26 is operable to control light emitter 30 to emit light at an output rate greater than the refresh rate. Such a greater output rate can reduce flicker in dynamic-voltage-control display 90.

Embodiments of the present disclosure illustrated in FIGS. 1-4 comprise an LED as a functional device controlled and driven by output circuit 26. However, in some embodiments, dynamic-voltage-control pixel 20 can comprise, control, or drive other functional devices. Thus, according to some embodiments, a dynamic-voltage-control circuit comprises a circuit memory (e.g., corresponding to pixel memory 22), input circuit 24 operable at refresh voltage 42 to receive circuit data and store the received circuit data in the circuit memory, and output circuit 26 operable at drive voltage 44 to read the stored circuit data from the circuit memory, a functional circuit (e.g., corresponding to light emitter 30), and a functional drive circuit operable at drive voltage 44 to read the stored circuit data from the circuit memory and control the functional circuit to operate according to the read stored circuit data (e.g., corresponding to light-emitter circuit 32). Drive voltage 44 can be less than refresh voltage 42. Refresh voltage 42 and drive voltage 44 can be provided to the circuit memory, input circuit 24, and output circuit 26 with a common-voltage wire 40 (connection). In some embodiments, refresh voltage 42 and drive voltage 44 can be provided to the circuit memory, input circuit 24, and output circuit 26 with separate voltage wires, e.g., a refresh-voltage wire 42 and a drive-voltage wire 44. In some such embodiments, refresh voltage 42 can be zero when the dynamic-voltage-control circuit is operating in only a drive voltage mode and is not inputting or refreshing data in order to save power. During a refresh mode, refresh voltage 42 can be set at a voltage greater than the drive voltage 44 to improve signal-to-noise ratio. Examples of other functional circuits include processors, application-specific integrated circuits (ASICs), light receiving devices (e.g., photo diodes, light sensors), opto-electronic circuits, and electromechanical circuits.

In embodiments of the present disclosure, drive voltage 44 can be no greater than 2 volts, no greater than 1.5 volts, no greater than 1.2 volts, no greater than 1.1 volts, no greater than 1.0 volts, no greater than 0.9 volts, no greater than 0.8 volts, or no greater than 0.7 volts so that dynamic-voltage-control display 90 operates at such voltages during the drive mode. Such relatively low drive voltages 44 compared to refresh voltage 42 (e.g., no less than 2 volts, no less than 2.3 volts, or no less than 2.5 volts) can greatly reduce leakage current, especially at photolithographic process resolutions (nodes) no greater than 100 nm, no greater than 60 nm, no greater than 50 nm, no greater than 40 nm, no greater than 30 nm, no greater than 20 nm, no greater than 10 nm, or no greater than 5 nm. Leakage current due to thinner gate dielectrics can increase at a greater-than-linear rate as process resolution decreases and can be reduced at a greater-than-linear rate as operating voltage decreases, thus improving power efficiency in dynamic-voltage-control display 90.

Dynamic-voltage-control pixel 20 can be or comprise a bare unpackaged integrated circuit disposed on display substrate 10, for example by micro-transfer printing, having an integrated circuit substrate separate, individual, and independent of and non-native to display substrate 10. The bare, unpackaged integrated circuit can be a CMOS silicon integrated circuit and can have a length or width no greater than 200 μm (e.g., no greater than 100 μm, no greater than 50 μm, or no greater than 20 μm, or no greater than 10 μm) and a thickness no greater than 50 μm (e.g., no greater than 20 μm, no greater than 10 μm or no greater than 5 μm). In some embodiments, display substrate 10 can be a semiconductor substrate (e.g., a silicon substrate) and dynamic-voltage-control pixel 20 can be native to display substrate 10. In some embodiments, dynamic-voltage-control pixel 20 can be or comprise a thin-film circuit disposed on and native to display substrate 10. In some embodiments, dynamic-voltage-control pixel 20 can be disposed with light emitter 30 and light-emitter drive circuit 32 on a pixel substrate to form a pixel module separate from display substrate 10.

Row or column controllers 50R, 50C can be integrated circuits providing control, input, and output signals, for example onto row or column wires 52R, 52C. Row and column wires 52R, 52C can comprise any patterned electrically conductive material, such as a metal, metal alloy, transparent conductive metal oxide, or electrically conductive polymer disposed over display substrate 10 and designed to transmit electrical signals such as row-select or column-data signals.

Row and column wires 52R, 52C that transmit the electrical signals have a resistance, parasitic capacitance, inductance, and reactance, and can have transmission line impedance discontinuities (e.g., IR drop and impedance of the signal wires) that limit the rate at which data can be transmitted on the signal wires with an acceptable signal-to-noise ratio and hence the refresh rate and size of pixel array 12 of dynamic-voltage-control pixels 20 on display substrate 10. More powerful drive circuitry in row or column controllers 50R, 50C or dynamic-voltage-control pixels 20 and careful transmission line design can mitigate, but not eliminate, this limitation. According to embodiments of the present disclosure, the use of refresh voltage 42 greater than display voltage 44 in dynamic-voltage-control pixels 20 refresh (input or update) mode or drive (output or display) mode, respectively, provides improved signal-to-noise ratio for pixel data communication and also reduces power use in dynamic-voltage-control display 90.

In some embodiments, dynamic-voltage-control pixels 20 comprise more than one light emitter 30 or light-emitter drive circuit 32. For example, dynamic-voltage-control pixels 20 can comprise three light emitters 30, for example one each for a red, green, and blue light emitter 30, together with sufficient pixel memory 22 to store corresponding pixel data.

Display substrate 10 can be any useful substrate on which pixel array 12 of dynamic-voltage-control pixels 20, row wires 52R, and column wires 52C can be suitably disposed. Display substrate 10 can be flexible or rigid and can be substantially flat. Generally, display substrate 10 has two opposing smooth sides suitable for material deposition, photolithographic processing, or micro-transfer printing of light emitters 30. Display substrate 10 can have a size of a conventional display, for example a rectangle with a diagonal of a few centimeters to one or more meters. Display substrate 10 can include polymer, plastic, resin, fiberglass, polyimide, PEN, PET, metal, metal foil, glass, a semiconductor, ceramic, quartz, sapphire, or other substrates found in the display or integrated circuit industries and can have a transparency greater than or equal to 50%, 80%, 90%, or 95% for visible light. In some embodiments of the present disclosure, light emitters 30 emit light through display substrate 10. In some embodiments, light emitters 30 emit light in a direction opposite display substrate 10. Display substrate 10 can have a thickness from 5 μm to 20 mm (e.g., 5 to 10 μm, 10 to 50 μm, 50 to 100 μm, 100 to 200 μm, 200 to 500 μm, 500 μm to 0.5 mm, 0.5 to 1 mm, 1 mm to 5 mm, 5 mm to 10 mm, or 10 mm to 20 mm). According to some embodiments of the present disclosure, display substrate 10 can include layers formed on an underlying structure or substrate, for example a rigid or flexible glass or plastic substrate.

Column wires 52C and row wires 52R can be conductive wires (e.g., photolithographically defined electrical conductors such as metal lines) disposed on display substrate 10 that conduct electrical current from column and row controllers 50C, 50R, respectively, to dynamic-voltage-control pixels 20. In matrix-addressed flat-panel pixel array 12, column wires 52C can conduct column signals such as column data signals and row wires 52R can conduct row signals such as timing or control signals, for example row-select signals. Column and row designations are arbitrary and can be interchanged without affecting the embodiments described in the present disclosure. Column controller 50C can be, for example, an integrated circuit that provides control, timing (e.g., clocks) or data signals (e.g., column-data signals) through column wires 52C to pixel columns of dynamic-voltage-control pixels 20 to enable dynamic-voltage-control pixels 20 to control light emitters 30 in dynamic-voltage-control display 90. Each column wire 52C can be electrically separate and optionally independently controlled from every other column wire 52C by column controller 50C. Column controller 50C can comprise a single integrated circuit or can comprise multiple integrated circuits, e.g., electrically connected integrated circuits. The integrated circuit(s) can be micro-transfer printed as bare unpackaged dies and can comprise broken (e.g., fractured) or separated tether(s).

Row controller 50R can be, for example, an integrated circuit that provides control signals (e.g., row-select signals) and/or timing signals (e.g., clocks or timing signals such as pulse-width modulation (PWM) signals) through row wires 52R to pixel rows of dynamic-voltage-control pixels 20 to cause dynamic-voltage-control pixels 20 to control light emitters 30 in dynamic-voltage-control display 90. Each row wire 52R can be electrically separate and optionally independently controlled from every other row wire 52R by row controller 50R. Row controller 50R can comprise a single integrated circuit or can comprise multiple integrated circuits, e.g., electrically connected integrated circuits. The integrated circuit(s) can be micro-transfer printed as bare unpackaged dies and can comprise broken (e.g., fractured) or separated tether(s).

Pixel array 12 of dynamic-voltage-control pixels 20 can be a completely regular pixel array 12 (e.g., as shown in FIG. 1) or can have pixel rows or pixel columns of dynamic-voltage-control pixels 20 that are offset from each other, so that pixel rows or pixel columns of dynamic-voltage-control pixels 20 are not disposed in a straight line and can, for example, form a zigzag line (not shown in the Figures) or, as another example, have non-uniform spacing(s).

Dynamic-voltage-control pixels 20 can be active- or passive-matrix dynamic-voltage-control pixels 20, can be analog or digital, and can comprise one or more light emitters 30. Dynamic-voltage-control pixels 20 can comprise micro-light-emitting diodes, e.g., inorganic light-emitting diodes such as horizontal inorganic light-emitting diodes or vertical inorganic light-emitting diodes (not shown in the Figures). Inorganic light-emitting diodes can have a small area, for example having a length and a width each no greater than 10 μm, no greater than 20 μm, no greater than 50 μm, no greater than 100 μm, or no greater than 200 μm.

In a method according to some embodiments of the present disclosure, integrated circuits (e.g., comprising dynamic-voltage-control pixels 20) are disposed on display substrate 10 by micro transfer printing. In some methods, integrated circuits (or portions thereof) or light emitters 30 (e.g., micro-LEDs) are disposed on a pixel substrate to form a heterogeneous dynamic-voltage-control pixel 20 and dynamic-voltage-control pixel 20 is disposed on display substrate 10 using compound micro-assembly structures and methods, for example as described in U.S. patent application Ser. No. 14/822,868 filed Aug. 10, 2015, entitled Compound Micro-Assembly Strategies and Devices. In some methods of the present disclosure, dynamic-voltage-control pixels 20 are disposed on display substrate 10 using pick-and-place methods found in the printed-circuit board industry, for example using vacuum grippers. Dynamic-voltage-control pixels 20 can be interconnected on display substrate 10 using photolithographic methods and materials or printed circuit board methods and materials.

In certain embodiments, display substrate 10 includes material, for example glass or plastic, different from a material in an integrated-circuit substrate, for example a semiconductor material such as silicon or GaN. Light emitters 30 can be formed separately on separate semiconductor substrates, assembled onto pixel substrates to form dynamic-voltage-control pixels 20 and then the assembled units are located on the surface of display substrate 10. This arrangement has the advantage that the integrated circuits or dynamic-voltage-control pixels 20 can be separately tested on pixel substrate and the pixel modules accepted, repaired, or discarded before dynamic-voltage-control pixels 20 are located on display substrate 10, thus improving yields and reducing costs.

In some embodiments, red, green, and blue light emitters 30 (e.g., micro-LEDs) are micro transfer printed to pixel substrates or display substrate 10 in one or more transfers and can comprise broken (e.g., fractured) or separated LED tethers as a consequence of micro-transfer printing. For a discussion of micro-transfer printing techniques that can be used or adapted for use in methods disclosed herein, see U.S. Pat. Nos. 8,722,458, 7,622,367 and 8,506,867, each of which is hereby incorporated by reference in its entirety. The transferred light emitters 30 are then electrically connected to dynamic-voltage-control pixels 20, for example with conductive wires and optionally including connection pads and other electrical connection structures, to enable a column controller 50C or row controller 50R to electrically interact with dynamic-voltage-control pixels 20 and therefore enable light-emitters 30 to emit light.

In some embodiments of the present disclosure, pixel array 12 of dynamic-voltage-control pixels 20 (e.g., as in FIG. 2) can include at least 40,000, 62,500, 100,000, 500,000, one million, two million, three million, six million, eight million, or thirty-two million dynamic-voltage-control pixels 20, for example for a quarter VGA, VGA, HD, 4K, or 8K display having various pixel densities (e.g., having at least 50, at least 75, at least 100, at least 150, at least 200, at least 300, or at least 400 pixels per inch (ppi)). In some embodiments of the present disclosure, light emitters 30 in dynamic-voltage-control pixels 20 can be considered integrated circuits, since they are formed in a substrate, for example a wafer substrate, or layer using integrated-circuit processes. The substrate or layer need not necessarily be silicon, for example III-V semiconductor wafers or layers can be used to form light emitters 30 using integrated-circuit processes and are considered integrated circuits (or portions thereof) in the context of this disclosure.

By employing a multi-step transfer or assembly process, increased yields are achieved and thus reduced costs for pixel arrays 12 of the present disclosure. Additional details useful in understanding and performing aspects of the present disclosure are described in U.S. patent application Ser. No. 14/743,981, filed Jun. 18, 2015, entitled *Micro Assembled Micro LED Displays and Lighting Elements*, the disclosure of which is hereby incorporated by reference herein in its entirety.

As is understood by those skilled in the art, the terms "over", "under", "above", "below", "beneath", and "on" are relative terms and can be interchanged in reference to different orientations of the layers, elements, and substrates included in the present disclosure. For example, a first layer on a second layer, in some embodiments means a first layer directly on and in contact with a second layer. In other embodiments, a first layer on a second layer can include another layer there between.

As is also understood by those skilled in the art, the terms "column" and "row", "horizontal" and "vertical", and "x" and "y", "top" and "bottom", and "left" and "right" are arbitrary designations that can be interchanged (unless otherwise clear from context).

Throughout the description, where apparatus and systems are described as having, including, or comprising specific components, or where processes and methods are described as having, including, or comprising specific steps, it is contemplated that, additionally, there are apparatus, and systems of the disclosed technology that consist essentially of, or consist of, the recited components, and that there are processes and methods according to the disclosed technology that consist essentially of, or consist of, the recited processing steps.

It should be understood that the order of steps or order for performing certain action is immaterial so long as operability is maintained. Moreover, two or more steps or actions in some circumstances can be conducted simultaneously. The disclosure has been described in detail with particular express reference to certain embodiments thereof, but it will be understood that variations and modifications can be effected within the spirit and scope of the following claims.

PARTS LIST

P power
10 display substrate
12 pixel array
20 dynamic-voltage-control pixel
22 pixel memory
24 input circuit
26 output circuit
30 light emitter
32 light-emitter drive circuit
40 common-voltage wire/common voltage
42 refresh-voltage wire/refresh voltage
44 drive-voltage wire/drive voltage
46 voltage selector/multiplexer
48 mode-select signal
50 display controller
50C column controller
50R row controller
52C column wire
52R row wire
90 dynamic-voltage-control display
100 provide display with pixels step
110 set voltage to refresh voltage step
120 load pixel data step
130 set voltage to drive voltage step
140 output pixel data step
200 select row step
210 set selected row to refresh voltage step
220 load pixel data for selected row step
230 set unselected row to drive voltage step
240 output pixel data for unselected rows step
250 set selected row to drive voltage step
260 output pixel data for selected row step
330 set drive row wire to drive voltage step
340 output pixel data step
350 set selected row wire to zero voltage step

What is claimed:

1. A dynamic-voltage-control pixel, comprising:
a pixel memory;
an input circuit operable, at a non-zero refresh voltage, to receive pixel data and store the pixel data in the pixel memory;
a light emitter comprising a light-emitting diode; and
an output circuit operable, at a non-zero drive voltage, to read the pixel data from the pixel memory and then control the light emitter to generate light in response to the non-zero drive voltage and output the generated light according to the pixel data,
wherein the drive voltage is less than the refresh voltage, and
wherein the dynamic-voltage-control pixel is operable to dynamically select both the drive voltage and the refresh voltage based on a mode-select signal between a drive mode and a refresh mode.

2. The dynamic-voltage-control pixel of claim 1, wherein the pixel memory has a refresh leakage current at the refresh voltage and a drive leakage current at the drive voltage, and wherein the refresh leakage current is greater than the drive leakage current.

3. The dynamic-voltage-control pixel of claim 1, wherein the pixel memory is a static memory.

4. The dynamic-voltage-control pixel of claim 1, wherein any one or more of the input circuit, the pixel memory, and the output circuit are electrically connected to a refresh-voltage wire and a drive-voltage wire separate from the refresh-voltage wire and wherein the any one or more of the input circuit, the pixel memory, and the output circuit comprises a voltage-selection circuit for selecting the drive-voltage wire or the refresh-voltage wire.

5. The dynamic-voltage-control display of claim 4, comprising a row controller, wherein the row controller comprises the voltage-selection circuit.

6. The dynamic-voltage-control display of claim 4, comprising a column controller, wherein the column controller comprises the voltage-selection circuitselector.

7. The dynamic-voltage-control pixel of claim 1, comprising a common-voltage wire connected to the input circuit, the pixel memory, and the output circuit.

8. A dynamic-voltage-control display, comprising:

dynamic-voltage-control pixels each according to claim 1; and a display controller operable to control the dynamic-voltage-control pixels.

9. The dynamic-voltage-control display of claim 8, wherein the display controller is operable to provide the drive voltage to the dynamic-voltage-control pixels in the drive mode and provide the refresh voltage in the refresh mode, wherein the dynamic-voltage-control pixels are operable to (i) receive respective pixel data and store the respective pixel data in the pixel memory in the refresh mode and (ii) read the respective pixel data from the pixel memory and then control the light emitter to output light according to the respective pixel data in the drive mode.

10. The dynamic-voltage-control display of claim 8, wherein the dynamic-voltage-control pixels are electrically connected in common to a common-voltage wire controlled by the display controller to provide the refresh voltage in the refresh mode on the common-voltage wire and to provide the drive voltage in the drive mode on the common-voltage wire.

11. The dynamic-voltage-control display of claim 8, wherein the dynamic-voltage-control pixels in the array are arranged in rows and columns and the dynamic-voltage-control pixels in each of the rows are connected in common to a common row voltage wire for the row that is controlled by the display controller.

12. The dynamic-voltage-control display of claim 11, wherein the display controller is operable to provide the refresh voltage to a refresh row of the rows and the drive voltage to drive rows of the rows that are each different from the refresh row.

13. A method of controlling a dynamic-voltage-control display according to claim 11, comprising:

providing the refresh voltage to a refresh row of the dynamic-voltage-control pixels and providing pixel data to the refresh row of the pixels; and providing the drive voltage to drive rows of the dynamic-voltage-control pixels other than the refresh row of dynamic-voltage-control pixels and driving the light emitters of the dynamic-voltage-control pixels in the drive rows to emit light.

14. The method of claim 13, comprising successively selecting different refresh rows of the pixels.

15. The method of claim 13, comprising providing pixel data to the refresh row of dynamic-voltage-control pixels at a refresh rate and driving the dynamic-voltage-control pixels in the drive rows of dynamic-voltage-control pixels at a drive rate, and wherein the drive rate is greater than the refresh rate.

16. The dynamic-voltage-control display of claim 8, wherein the display controller is operable to provide pixel data to each of the dynamic-voltage-control pixels at a refresh rate and the refresh voltage is directly dependent on the refresh rate.

17. The dynamic-voltage-control display of claim 8, wherein, for each of the dynamic-voltage-control pixels, the display controller is operable to provide pixel data to the dynamic-voltage-control pixel at a refresh rate and the output circuit of the dynamic-voltage-control pixel is operable to control the light emitter of the dynamic-voltage-control pixel to emit light at an output rate greater than the refresh rate.

18. The dynamic-voltage-control display of claim 8, wherein the display controller is operable to provide pixel data to the dynamic-voltage-control pixels at a data rate that is directly dependent on the refresh rate.

19. The dynamic-voltage-control display of claim 8, wherein at least some of the dynamic-voltage-control pixels are connected to a refresh voltage wire controlled by the display controller and to a drive voltage wire controlled by the display controller, and the display controller is operable to (i) provide the refresh voltage to the refresh voltage wire and pixel data to the at least some of the dynamic-voltage-control pixels that are in a row of pixels at the refresh voltage in the refresh mode and (ii) provide a zero voltage to the refresh voltage wire to the row of pixels in the drive mode.

20. A method of controlling a dynamic-voltage-control display according to claim 19, comprising:

providing the refresh voltage to the at least some of the dynamic-voltage-control pixels on the refresh voltage wire;

refreshing the pixel memory of the at least some of the dynamic-voltage-control pixels with the pixel data;

providing the drive voltage to the at least some of the dynamic-voltage-control pixels on the drive voltage wire; and providing a zero voltage to the at least some of the dynamic-voltage-control pixels on the refresh voltage wire.

21. A method of controlling a dynamic-voltage-control pixel according to claim 1, comprising:

providing the refresh voltage to the dynamic-voltage-control pixel;

refreshing the pixel memory with the pixel data;

providing the drive voltage to the dynamic-voltage-control pixel; and reading the pixel data from the pixel memory and controlling the light emitter to output light corresponding to the pixel data.

22. The dynamic-voltage-control pixel of claim 1, wherein the non-zero refresh voltage is provided on a wire, wherein the pixel data is provided on a different wire, and wherein the output circuit stores the pixel data in the pixel memory during a first time.

23. The dynamic-voltage-control pixel of claim 22, wherein the output circuit is operable at the refresh voltage during the first time, wherein the light emitter outputs light during a second time, and wherein the second time is different from the first time.

24. The dynamic-voltage-control pixel of claim 23, further comprising: a voltage-selection circuit operable to provide the selected voltage to the output circuit, the voltage-selection circuit responsive to the mode-select signal to select between the refresh voltage during the first time and the drive voltage during the second time.

25. A dynamic-voltage-control circuit, comprising:

a circuit memory;

an input circuit, operable at a non-zero refresh voltage, to receive circuit data and store the circuit data in the circuit memory;

a functional circuit; and a functional drive circuit, operable at a non-zero drive voltage, to read the circuit data from the circuit memory and then control the functional circuit to operate according to the circuit data, wherein the drive voltage is less than the refresh voltage, and wherein the dynamic-voltage-control circuit is operable to dynamically select both the drive voltage and the refresh voltage based on a mode-select signal between a drive mode and a refresh mode.

26. The dynamic-voltage-control circuit of claim 25, wherein the refresh voltage is provided on a wire, wherein the circuit data is provided on a different wire, and wherein the drive circuit stores the circuit data in the circuit memory during a first time.

27. The dynamic-voltage-control circuit of claim 26, wherein the drive circuit is operable at the refresh voltage during the first time, wherein the drive circuit is operable at the non-zero drive voltage during a second time, and wherein the second time is different from the first time.

28. The dynamic-voltage-control circuit of claim 27, further comprising: a voltage-selection circuit responsive to the mode-select signal to select between the refresh voltage during the first time and the drive voltage during the second time providing the selected voltage to the output circuit.

* * * * *